United States Patent Office  3,654,106
Patented Apr. 4, 1972

3,654,106
ISOCYANATE-CONTAINING TELOMERS AND A PROCESS FOR THE PRODUCTION THEREOF
Kuno Wagner and Wulf von Bonin, Leverkusen, Germany, assignors to Farbenfabriken Bayer Aktiengesellschaft, Leverkusen, Germany
No Drawing. Filed Nov. 6, 1968, Ser. No. 773,964
Claims priority, application Germany, Nov. 9, 1967,
F 53,991
Int. Cl. C08d 1/34; C08g 22/16, 22/34
U.S. Cl. 204—159.23                       6 Claims

ABSTRACT OF THE DISCLOSURE

Isocyanate group containing telomers are prepared by reacting ethylenically unsaturated monomers with organic isocyanates in the presence of heat, high energy radiation, peroxidic radical forming agents and/or nitrogen containing radical forming agents or combination thereof.

---

This invention relates to isocyanate group containing telomers and a method of preparing the same.

It has been heretofore known in U.S. Pat. 3,225,119 to react vinyl monomers with isocyanate monomers in the presence of catalysts that promote the formation of dicarbanions to prepare thermoplastic copolymers. The NCO group of the isocyanate enters into the reaction and the product does not contain available NCO groups for further reaction.

It is an object of this invention to provide isocyanate-containing telomers. It is another object of this invention to provide a method of preparing isocyanate-containing telomers. It is still another object of this invention to provide isocyanate-containing intermediates suitable for use in the polyaddition reaction.

The foregoing objects and others which will become apparent from the following description are accomplished in accordance with the invention, generally speaking, by providing isocyanate-containing telomers by reacting organic mono- and/or polyisocyanates and ethylenically unsaturated monomers in the presence of heat, high energy radiation, peroxidic radical-forming agents and/or nitrogen containing radical forming agents or combinations thereof.

Organic mono and polyisocyanates have a marked effect on the polymerization of olefinically unsaturated compounds leading to the formation of novel isocyanate-containing reaction products.

Mono- or polyisocyanates which contain hydrogen atoms in the α-position to the NCO group act as powerful chain transfer agents in radical polymerization of olefinically unsaturated monomers, formation of almost every new chain bein initiated by a transfer fragment. As a result, only polymer molecules which contain the transfer fragments of the mono- or polyisocyanate are formed to any appreciable extent. The polyisocyanates used in the preparation of the products of this process may therefore be termed telogens and ethylenically unsaturated monomers as taxogens according to the conventional nomenclature of the chemistry of telomerization.

Thus according to the present invention, olefinically unsaturated monomers are reacted with all sorts of different mono- and/or polyisocyanates. Preferably isocyanates which carry at least one hydrogen atom in the α-position to the NCO group are used. The reaction takes place in the presence of radical-forming agents or radiation which emits a large amount of heat and energy, at temperaures between 50° C. and 200° C., the isocyanates used serving to form the end groups of the polymer molecules, being mainly linked through their α-carbon atoms while the NCO groups are left unreacted.

For example, when hexamethylene diisocyanate is used as telogen, the following reaction sequence occurs:

(1) Initiation reaction:

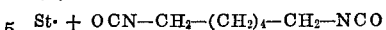

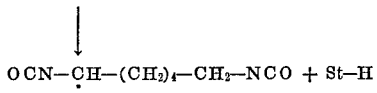

(2) Propagation reaction:

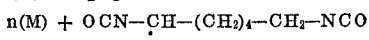

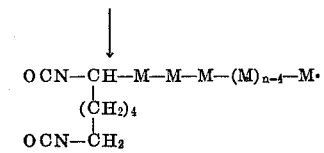

M=Monomeric vinyl compound
St·=initiator radical (3) Termination and formation of new transfer fragment which starts the new chain:

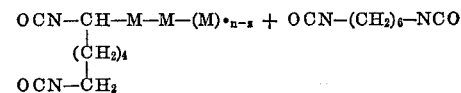

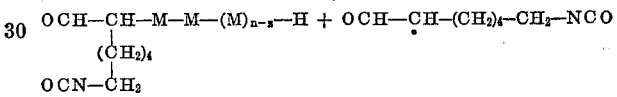

Since hexamethylene diisocyanate has two equivalent $CH_2$ groups in the α-position to the NCO groups, the formation of two polymeric lateral branches in accordance with the chain reaction indicated above is possible and the extent of polymerization is merely a function of the concentration of the telogen, taxogen and initiator radicals.

The products of the process are termed "telomers" because of analytical evidence for the presence of NCO groups in the purified products of the process, the ease with which the products can be converted into poly-addition products with polyamines or polyfunctional hydroxyl compounds, and because of the IR spectroscopical data and the Nuclear Resonance spectrum. As a result of this evidence, it can be seen that NCO groups on a primary carbon atom of the telogen are completely or partially converted into NCO groups which are situated on a secondary or tertiary carbon atom after telomerization has taken place.

Telomerization reactions using mono and polyisocyanates are novel. In prior art processes for the preparation of highly cross-linked polyester resins which contain urethane groups and which are resistant to saponification (DAS No. 1,033,895 and DAS No. 1,056,365) for example, copolymerization of unsaturated polyester polyurethanes with vinyl compounds takes place, highly cross-linked synthetic resins being obtained.

The process according to the invention is very simple and can be carried out wtihout pressure or under pressure. When carrying out the process according to the present invention, the reaction is usually carried out at elevated temperature although in special cases, for example if one does not require maximum yields, temperatures of around room temperature may also be employed. A suitable range of reaction temperatures thus extends e.g. from 15–250° C., although it is preferred to operate at temperatures of 30 to 200° C.

The process according to the invention may be carried out either in the presence or absence of solvents. The molar ratios of telogen and taxogen employed in the process according to the invention are not critical and may vary within wide limits. However, the telogen is preferably used in excess of the taxogen.

According to one preferred embodiment, the mono- or polyisocyanates are reacted together with the ethylenically unsaturated, polymerizable monomers in the absence of solvents. In this case the isocyanate telogen is present initially in large excess, e.g. about 3 to 8 mols and preferably 4 to 5 mols per 0.1 mol of taxogen so that 1 to 6 and preferably 3 to 4 mols of telogen are still present at the end of telomerization, and the telomer is dissolved in the excess telogen in a concentration of 50 to 60% by weight. By adopting this procedure, one may obtain products having a molecular weight of 1000 to 4000, and which are readily soluble mono or polyisocyanates which are completely free from cross linkages. These products can easily be freed from isocyanates which have not taken part in the telomerization by use of a thin layer evaporator, by extraction with organic solvents or by column chromatography.

If one wishes to obtain high molecular weight, NCO-containing telomers by the process of the invention, the concentration of the telogen should be reduced, e.g. so that only 0.2 to 1 mol of telogen reacts with 10 to 20 times the molar quantity of taxogen. In this case, it is advantageous to carry out the reaction in inert solvents such as benzene, toluene, chlorobenzene, o-dichlorobenzene, benzonitrile or nitrobenzene.

In one particularly preferred embodiment of the process according to the invention, both the NCO functionality of the telomers can be increased and all the homopolymer portions which are free from NCO can be provided with NCO groups. This is achieved by using small amounts of comonomers which contain functional groups (about 1 to 2.5 mols of comonomer to 10 mols of monomer), for example vinyl monomers which contain NCO, hydroxyl, amido, N-methylolalkylether or acid groups, in the process of telomerization (see Example 8 et seq.). Telomers having increased NCO functionality are thereby obtained since the above mentioned functional groups react with the isocyanate telogens which are present in large excess, so that, for example, one isocyanate derivative having a free NCO group is formed for each OH, NH$_2$, COOH etc. group present. In this variation of the process it is therefore possible to obtain polyisocyanate telomers of high functionality which are readily soluble and highly fluid in thin layer evaporators so that they can readily be freed from monomeric telogens without cross-linking.

In many cases in which removal of the monomeric isocyanates is not necessary in view of the purpose for which the products are subsequently to be used, the process of the invention may be carried out with polyisocyanates which are in the process of formation. For example, the preparation of N,N',N''-tris-(isocyanatohexyl)-biuret and other types of biuret compounds from polyfunctional isocyanates and suitable polyamines or the preparation of addition products of 3 mols of a bifunctional diisocyanate and 1 mol of a trifunctional polyol or the polymerization of polyisocyanates to isocyanurates may be coupled with the preparation of telomers by reacting the olefinically unsaturated compounds with the polyisocyanates, which are in the process of formation, in the presence of radical forming agents according to the present invention. Similarly, the preparation of biuret polyisocyanates from aliphatic, cycloaliphatic or araliphatic diisocyanates and tertiary butanol, for example, may also be coupled with the process according to the invention, the biuret polyisocyanates which are in the process of formation in such a case participating as telogens in the polymerization reaction.

Solutions of the mono- and polyisocyanates in inert organic solvents such as benzene, toluene, chlorobenzene, ethyl glycol acetate, butyl acetate, benzonitrile, nitrobenzene or dichlorobenzene may, of course, also be used for the preparation of the products of the process, but it is preferred to use mono- and polyisocyanates in bulk, either liquid isocyanates or isocyanate melts being used for the telomerization reaction.

The mono- or polyisocyanates used as telogens for carrying out the telomerization process according to the invention, may be of any type. If one wishes to obtain high quality, light fast telomerization products containing at least two NCO groups in the molecule, it is preferable to use aliphatic, cycloaliphatic, araliphatic or isocyanurate-containing copolymers of these polyisocyanates with aromatic polyisocyanates. The following are examples of aliphatic, cycloaliphatic and araliphatic polyisocyanates:

1,4-tetramethylenediisocyanate,
1,5-pentamethylenediisocyanate,
1,6-hexamethylene diisocyanate,
2,4,4-trimethyl-1,6-diisocyanatohexane,
1,1,2-dodecamethylene diisocyanate,
1,2-diisocyanatocyclobutane,
dicyclohexyl-4,4'-diisocyanate,
dicyclohexylmethane-4,4'-diisocyanate,
p- and m-xylylene diisocyanate,
1-methyl-2,4-diisocyanatocyclohexane, and
isophorone-diisocyanate.

Other suitable compounds are triisocyanate, e.g. biuret triisocyanates which can be prepared from the above mentioned diisocyanate, e.g. by the process described in German patent specification No. 1,101,394 and addition products of the above mentioned diisocyanates with low molecular weight trifunctional polyols, e.g. addition products of 3 mols of diisocyanate with 1 mol of trimethylolpropane, glycerol, aminoethanol, diethanolamine, triethanolamine, 3 - amino - propanol-(1), or N-cyclohexyltrimethylene diamine, or addition products of 2 mols of diisocyanate with 1 mol of N-methydiethanolamine, N-methyldipropanolamine, 2-methylaminoethanol, 3-ethoxypropylamine, cyclohexylamine, 2-hydroxyethyl-cyclohexylamine or 1-cyclohexylaminopropanol-(2). Polymers and copolymers of the above mentioned diisocyanates with aromatic diisocyanates e.g. those which contain about 40% of 1,6-hexamethylenediisocyanate and about 60% of 1-methylbenzene-2,4-diisocyanate, i.e. polyisocyanates which may contain several isocyanurate rings, are also suitable. Polyisocyanates which have been prepared by the process described in U.S. Pat. No. 3,124,605 may also be used as telogens. High molecular weight polyisocyanates may also be used in the process according to the invention as starting compounds, for example those which can be obtained by the diisocyanate polyaddition process, e.g. from hydroxyl-containing and/or amino-containing polyesters, polyethers, polythioethers, polycarbonates, polyacetals and polysiloxanes, and excess polyisocyanates.

According to the invention, telomers which contain a single NCO group can also be prepared using monoisocyanate starting compounds as telogens in process of the present invention e.g. monoisocyanates of the following type: methoxymethyl isocyanate, methyl isocyanate, ethyl isocyanate, propyl isocyanate, butyl isocyanates, allyl isocyanate, cyclohexyl isocyanate, stearyl isocyanate, and benzyl isocyanate. Derivatives of these products of the process may be used, for example, as plasticizers, stabilizers and as auxiliary agents in the treatment of textile products.

If aromatic polyisocyanates are used as starting compounds, the taxogen used is preferably monomeric styrene, which leads to production of a telomer in excellent yield. Other taxogens which may be used include acrylic acid esters, methacrylic acid ester, or vinylacetate, which also telomerize well with aromatic polyisocyanates, especially under pressure, and which require only slightly increased quantities of radical forming agents. Suitable aromatic polyisocyanates include 2,4- and 2,6-toluylene diisocyanate and their commercial mixtures and chlorination products, p-phenylene diisocyanate, m-phenylene diisocyanate, ethylated 2,4- and 2,6-toluylene diisocyanates, triisopropylene diisocyanates, 4,4'-diisocyanatodiphenyl methane and isomers and ethylated derivatives thereof, 1,5-naphthylene diisocyanate, triphenylmethane-4,4,4''-triisocyanate, and the reaction products of polyhydric alcohols with an excess of aromatic diisocyanates, for example the reaction product of 1 mol of trimethylolpropane with 3 mols of toluylene diisocyanate. Uretdione isocyanates, masked polyisocyanaates which liberate their isocyanate groups on application of heat during the telomerization reaction and trimerized aromatic polyisocyanates, i.e. polyisocyanates which may contain several isocyanurate rings, may also be reacted, e.g. with styrene or acrylic acid esters, to give high yields. According to the present invention, one or more aliphatic, cycloaliphatic and araliphatic mono- and polyisocyanates which contain at least one hydrogen atom on a carbon atom in the $\alpha$-position to the NCO group are especially preferred. Other preferred compounds are 2,4- and 2,6-toluylene diisocyanate and mixtures thereof, 4,4'-diphenylmethane diisocyanate and 1,4-naphthylene diisocyanate.

Ethylenically unsaturated monomers which may be used in the process according to the invention include any olefinically unsaturated compounds which can undergo radical polymerization. The following compounds are mentioned as examples: ethylene, vinyl acetate, vinyl propionate, vinyl butyrate, styrene, methyl acrylate, ethyl acrylate, butyl acrylate, methyl methacrylate, vinyl chloride, vinylidene chloride, acrylonitrile, vinyl toluene, $\alpha$-methylstyrene, 2-chlorobutadiene, 2,3-dichlorobutadiene, butadiene, isoprene, methylvinylketone methyl isopropenylketone, N-vinylpyrrolidone and methyl vinyl sulphone.

Particularly preferred compounds are acrylic acid esters, vinyl chloride, styrene, chlorobutadiene, 2,3-dichlorobutadiene and vinyl esters. Pairs of monomers or ternary monomer systems which are copolymerizable may, of course, also be used in the process according to the invention. The following are examples of systems which are especially suitable: styrene/methyl acrylate, styrene/butyl acrylate, styrene/methyl methacrylate, styrene/acrylonitrile, methyl acrylate/styrene, ethylene/vinyl acetate, vinyl chloride/vinyl acetate, methyl acrylate/2-chlorobutadiene, styrene/maleic acid anhydride or esters.

The following are examples of particularly suitable ternary comonomer mixtures: styrene/methylmethacrylate and vinylidene chloride; styrene, acrylonitrile and vinylidene chloride; styrene, methyl methacrylate and acrylonitrile.

According to one particularly preferred feature of the process according to the invention, 1–15, prefereably 3–10, mols percent of olefinically unsaturated monomers which contain reactive groups, especially OH, $NH_2$, COOH, NCO or epoxy groups, can be incorporated in the telomers. Incorporation of vinyl isocyanate, methacrylic ester isocyanate or allyl isocyanate, for example, increases the NCO functionality of the products of the process. Examples of copolymerizable monomers which contain OH or COOH groups are $\beta$-hydroxymethylmethacrylate, $\beta$-hydroxypropylmethacrylate, $\beta$-hydroxypropylacrylate, acrylic acid, acrylamide or methacrylamide. Owing to the large excess of the polyisocyanates which are used as telogens, the OH, $NH_2$, or COOH groups are, surprisingly, immediately incorporated by polymerization without cross-linking occurring, isocyanate derivatives being formed in the process. Furthermore, up to 15 mols percent of acrylamide- or methacrylamide-N-methylol methyl ether, for example, or the reaction products of methoxymethylisocyanate with $\beta$-hydroxyalkylacrylates or $\beta$-hydroxyalkylmethacrylates may usually be included. When such aliphatic, araliphatic and cycloaliphatic isocyanates whose NCO groups are relatively inert to the tertiary bases are used, monomers which contain basic groups, such as N-(3 - dimethylamino - propyl)-acrylamide or methacrylic acid N,N-dimethylhydrazide may also be included.

Polymerizable monomers which contain epoxy groups, e.g. the glycidic esters of acrylic and methacrylic acid, may also be incorporated in the telomers.

In order to carry out the telomerization reaction according to the invention, radical forming agents and/or heating or/and high energy radiation are employed. The reaction proceeds especially advantageously and leads to maximum color fastness of the teleomers when carried out in the presence of organic nitrogen compounds which decompose to form free radicals, e.g. $\alpha,\alpha'$-azoisobutyric acid dinitrile, $\alpha,\alpha'$-azoisobutyric acid dimethylester, and $\alpha,\alpha'$-azo-$(\alpha,\gamma$-dimethyl$)$-valeric acid dinitrile. However, acryloylperoxides such as benzoyl peroxide or lauroylperoxide, and alkylhydroperoxides such as tertiary butyl hydroperoxide, cumene hydroperoxide, and 1,1'-dihydroxydicyclohexylperoxide may also be used, provided a certain amount of discoloration in the end products is permissible.

The radical forming agents are as a rule used in quantities of between 0.05 and 6% by weight but preferably in quantities of 0.5 to 1.5% by weight, based on the amount of monomer.

Monomers such as styrene which are easily polymerized by heat and/or light and/or high energy radiation react in the process according to the invention without the addition of radical-forming agents. Gaseous monomers such as vinyl chloride, ethylene or butadiene are usually reacted with the telogens under pressure, in which case pressures of between 50 and 300 excess atmospheres may be employed.

The process according to the invention may also be carried out with photochemical activation, although it is preferable to work with radical forming agents, if necessary using UV light as an additional source of energy, in some cases in combination with photo-sensitizers such as cerium (IV) salts, uranyl acetyl, benzoin derivatives, Michler's ketone etc. With this combined procedure, the yields in the case of vinyl monomer yields are frequently increased by about 5 to 15%.

The easily soluble polyisocyanates which can be prepared by the process according to the invention are new. As a rule, they have molecular weights of 500 to 60,000, preferably 600 to 4000. The products of the process can be used on their own for all known addition and polyaddition reactions, e.g. in the preparation of polyurethane or polyurea lacquers and coatings. They serve as excellent adhesives, e.g. for compound glass, and may also be used in the production of foam plastics of all types. In particular, the products when obtained from aliphatic, cycloaliphatic and araliphatic polyisocyanates and acrylates or methacrylates may be used in the production of lacquers having maximum light fastness and resistance to discoloration as heating.

The process according to the invention is described in more detail below by the following examples. The parts mentioned in the examples are parts by weight unless otherwise indicated.

EXAMPLE 1

About 600 parts of 1,6-hexamethylenediisocyanate in a three-necked flask equipped with thermometer, stirrer, dropping funnel and inlet tube for nitrogen are freed at about 130° C. from traces of oxygen by introducing a stream of nitrogen which is free from water and oxygen. About 500 parts of monomeric vinyl acetate in which about 7 parts of $\alpha,\alpha'$-azoisobutyric acid dinitrile are dissolved are then slowly introduced dropwise at a uniform rate at about 130° C. from a water cooled dropping funnel in the course of about 10 hours. The telomerization reaction is soon set going and is completed in the course of about 10 hours under an atmosphere of $N_2$. The reaction mixture is then freed from monomeric vinyl acetate under a water jet vacuum, and the vinyl acetate vapor which escapes is condensed in a cold trap which is cooled with a mixture of acetone and carbon dioxide. About 40 parts of unpolymerized vinyl acetate are obtained, i.e. the incorporation of vinyl acetate in the telomerization process is about 92%. The moderately viscous solution of telomer is freed from monomeric hexamethylene diisocyanate in a thin layer evaporator at about 130° C. under a high vacuum. The resulting highly fluid, slightly yellowish resin which is free from monomer has an NCO content of 5.3%. Yield 512 parts. The chemically bound hexamethylene diisocyanate content is calculated from the NCO content to be about 10.1%. The average molecular weight of the diisocyanate obtained by telomerization is about 1680.

In a subsequent experiment, the NCO-containing telomer free from monomer is reacted in a dilute solution in ethyl acetate with a hydroxyl-containing, branched polyester (5% OH) with the addition of about 0.2% of zinc octoate and 0.2 part of dimethylbenzylamine, and the reaction product is cross-linked by removal of the solvent by evaporation at about 100° C. over a period of about 4 hours. The cross-linked product is intensively extracted with methanol three times, and the homopolymer constituents of the vinyl acetate, which are readily soluble in methanol, are extracted. The total amount of homopolymer which can be extracted is 4.9%, based on the NCO-containing telomer. This result suggests that 95% of the polymerized vinyl acetate has undergone a telomerization reaction with hexamethylene diisocyanate.

EXAMPLE 2

The procedure is exactly the same as in Example 1 except that the temperature of telomerization is increased to about 150° C. and about 9 parts of α,α'-azoisobutyric acid nitrile are used for about 500 parts of vinyl acetate monomer. After the reaction mixture has been worked up as in Example 1, a telomerization product which has an NCO content of 7.5% is obtained. The chemically bound hexamethylene diisocyanate content is 15% and the average molecular weight is about 1100. Thus 1 molecule of hexamethylene diisocyanate has undergone telomerization with about 11 molecules of vinyl acetate.

EXAMPLE 3

The procedure is the same as that used in Example 1. About 600 parts of 1,6-hexamethylenediisocyanate are freed from oxygen at about 130° C. by passing through the reaction vessel a stream of dry nitrogen. About 500 parts of methyl acrylate in which about 7 parts of α,α'-azoisobutyric acid dinitrile are dissolved are then slowly introduced dropwise at a steady rate in the course of about 10 hours. The reaction mixture is then freed from monomeric methyl acrylate under a water jet vacuum, and the methyl acrylate vapor given off is condensed in a cold trap. About 40 parts of monomer are recovered, i.e. the methyl acrylate undergoes reaction to the extent of about 92% by weight in the course of the telomerization. The slightly viscous telomer solution is freed from monomeric hexamethylene diisocyanate in a thin layer evaporator under a high vacuum at about 130° C. A highly fluid, colorless, very glossy polyisocyanate which is free from monomer and which has an NCO content of 3.2% is obtained. Yield about 491 parts. The amount of chemically bound hexamethylenediisocyanate is about 6.2% and the average molecular weight of the telomer is about 2600. According to these figures, 1 molecule of hexamethylene diisocyanate has been telomerized with about 28 molecules of methyl acrylate.

The telomer is highly soluble in ethyl acetate, toluene, xylene, ethyl glycol acetate, chloroform and carbon tetrachloride and can be reacted with branched polyesters or polyamines which contain OH groups to form extremely light resistance lacquers and coatings.

EXAMPLE 4

The procedure used is the same as that described in Example 1, and the following reactants are used for the telomerization:

(a) About 500 parts of 1,6-hexamethylene diisocyanate and about 600 parts of styrene,
(b) About 500 parts of 1,6-hexamethylene diisocyanate and a mixture of about 300 parts of styrene and about 300 parts of methyl acrylate,
(c) About 500 parts of 1,6-hexamethylenediisocyanate and about 600 parts of butyl acrylate,
(d) About 500 parts of 1,6-hexamethylenediisocyanate, about 250 parts of methyl-methacrylate and about 250 parts of butyl acrylate.

The reactants are telomerized and the product is worked up in the manner described in Example 1. Highly fluid telemors which contain NCO groups are obtained in the thin layer evaporator without any premature cross-linking occurring, the resuls being as follows:

(a) 93% conversion of styrene; NCO content: 4.2% yield: About 612 parts;
(b) 92% conversion of styrene and methyl acrylate; NCO content of the resin 3.9%; yield. About 608 parts;
(c) 89% conversion of butyl acrylate; NCO content: 3.2%; yield: About 576 parts;
(d) 85% conversion of methyl methacrylate and butyl acrylate (based on the total monomer); NCO content 3.3%; yield: About 480 parts.

If the reaction mixture (a) to (d) are not freed from monomeric hexamethylene diisocyanate, the telomer solutions can easily be reacted, owing to their low viscosity, with hydroxyl-containing polyesters or polyethers and polyacetals to form polyurethane foams which contain, in the molecule, units of polystyrene, methyl polyacrylate or copolymers of the said monomers.

EXAMPLE 5

The procedure is the same as that described in Example 1 and the following reactants are used in the telomerization:

(a) About 600 parts of m-xylylene diisocyanates and about 400 parts of methyl acrylate,
(b) About 600 parts of isophorone diisocyanate and about 400 parts of methyl acrylate,
(c) About 600 parts of 2,4,4-trimethyl-1,6-diisocyanatohexane and about 500 parts of methyl acrylate,
(d) About 500 parts of 1-methyl-2,4-diisocyanato-cyclohexane and about 400 parts of methyl acrylate,
(e) About 500 parts of dicyclohexyl-methane-4,4'-diisocyanate and about 400 parts of methyl acrylate,
(f) About 500 parts of tetramethylenediisocyanate and about 400 parts of methyl acrylate.

The same procedure is used for (a) to (f) as in Example 1 and the telomerization products obtained are freed from monomeric polyisocyanates by thin layer evaporation.

Highly fluid telomers with the following percentage conversions and the NCO contents are obtained:

(a) 92% methyl acrylate conversion; yield: about 442 parts; NCO content: 8.6%;
(b) 93% methyl acrylate conversion; yield: about 414 parts; NCO content: 3.8%;
(c) 90% methyl acrylate conversion; yield: about 488 parts; NCO content: 3.5%;
(d) 85% methyl acrylate conversion; yield: about 380 parts; NCO content: 2.9%;
(e) 94% methyl acrylate conversion; yield: about 370 parts; NCO content: 2.1%;
(f) 93% methyl acrylate conversion; yield: about 385 parts; NCO content: 5.1%.

75% solutions of the above mentioned telomers in ethyl acetate or xylene/ethyl glycol acetate (1:1) react in the presence of 0.2% zinc octoate and 0.2% dimethylbenzylamine after they have been painted on glass to form light resistant, cross-linked polyurea lacquers which dry in air.

EXAMPLE 6

The telomerization is carried out according to the procedure of Example 1, the following reactants being used:

(a) About 500 parts of N,N',N''-tris-(isocyanatohexyl)-biuret and about 200 parts of vinyl acetate,
(b) About 300 parts of N,N',N''-tris-(isocyanatohexyl)-biuret and about 200 parts of methyl acrylate,
(c) About 500 parts of N,N',N''-tris-(isocyanatohexyl)-biuret, about 100 parts of styrene and about 100 parts of methyl acrylate,
(d) About 500 parts of an addition product of 1 mol of trimethylolpropane and 3 mols of 1,6-hexamethylene-diisocyanate and about 200 parts of methyl acrylate,
(e) About 500 parts of an addition product of 1 mol of trimethylolpropane and 3 mols of isophorone diisocyanate and about 200 parts of methyl acrylate,
(f) About 500 parts of an addition product of 1 mol of trimethylolpropane and 3 mols of m-xylylene diisocyanate, and about 200 parts of methyl acrylate,
(g) About 500 parts of an addition product of 1 mol of trimethylolpropane and 3 mols of 1,6-hexamethylene diisocyanate, and about 200 parts of butyl acrylate.

Solutions of the telomer in the light-resistant polyisocyanates which are used in excess are obtained with the following NCO contents and monomer conversions:

(a) Yield: About 682 parts; 91% vinyl acetate conversion; NCO content: 12.8%;
(b) Yield: About 684 parts; 92% methyl acrylate conversion; NCO content: 12.6%;
(c) Yield: About 680 parts; 90% conversion of total monomer; NCO content: 12.4%;
(d) Yield: About 682 parts; 91% methyl acrylate conversion; NCO content: 10.3%;
(e) Yield: About 680 parts; 90% methyl acrylate conversion; NCO content: 8.3%;
(f) Yield: About 690 parts; 95% methyl acrylate conversion; NCO content: 11.4%;
(g) Yield: About 684 parts; 92% methyl acrylate conversion; NCO content: 10.6%.

EXAMPLE 7

The telomerization is carried out in the manner described in Example 1, the following reactants being used:

(a) About 600 parts of 1,6-hexamethylenediisocyanate and a mixture of about 500 parts of methyl acrylate, about 40 parts of hydroxypropyl acrylate and about 7 parts of α,α'-azoisobutyric acid dinitrile,
(b) About 600 parts of 1,6-hexamethylenediisocyanate and a mixture of about 500 parts of methyl acrylate, about 45 parts of hydroxypropylmethacrylate and about 7 parts of α,α'azoisobutyric acid dinitrile,
(c) About 600 parts of m-xylylene diisocyanate and a mixture of about 500 parts of methyl acrylate, about 40 parts of hydroxylpropyl acrylate and about 7 parts of α,α'-azoisobutyric acid dinitrile,
(d) About 600 parts of isophorone diisocyanate and a mixture of about 500 parts of methyl acrylate, about 40 parts of hydroxypropyl acrylate and about 7 parts of α,α'-azoisobutyric acid dinitrile,
(e) About 600 parts of 1,6 - hexamethylenediisocyanate and a mixture of about 500 parts of methyl acrylate, about 40 parts of ethyl methacrylate isocyanate and about 7 parts of α,α'-azoisobutyric acid dinitrile.
(f) About 600 parts of 1,6 - hexamethylenediisocyanate and a mixture of about 500 parts of methyl acrylate, about 50 parts of allyl alcohol and about 7 parts of α,α'-azoisobutyric acid dinitrile,
(g) About 600 parts of 1,6 - hexamethylenediisocyanate and a mixture of about 500 parts of methyl acrylate, about 40 parts of acrylic acid and about 7 parts of α,α'-azoisobutyric acid dinitrile,
(h) About 60 parts of 1,6 - hexamethylenediisocyanate and a mixture of about 500 parts of methyl acrylate, about 20 parts of hydroxy propylacrylate, about 15 parts of methacrylamide - N - methylolmethylether and about 7 parts of α,α'-azoisobutyric acid dinitrile.

The telomerization is carried out in the course of about 8 hours in the manner described in Example 1 and the telomerization products are freed from the monomers by thin layer distillation at about 130° C. Telomerization products which have an increased NCO functionality are obtained.

(a) Yield: About 596 parts; 95% methyl acrylate conversion; NCO content: 6.7%;
(b) Yield: About 604 parts; 94% methyl acrylate conversion; NCO content: 6.5%;
(c) Yield: About 630 parts; 86% methyl acrylate conversion; NCO content: 13.2%;
(d) Yield: About 600 parts; 94% methyl acrylate conversion; NCO content: 4.9%;
(e) Yield: About 605 parts; 95% methyl acrylate conversion; NCO content: 6.8%;
(f) Yield: About 594 parts; 92% methyl acrylate conversion; NCO content: 5.8%;
(g) Yield: About 603 parts; 93% methyl acrylate conversion; NCO content: 6.1%;
(h) Yield: About 590 parts; 94% methyl acrylate conversion; NCO content: 4.5%.

EXAMPLE 8

The telomerization reaction is carried out using the procedure given in Example 1, and the following reactants are used:

(a) About 600 parts of hexamethylenediisocyanate and a mixture of about 500 parts of vinyl acetate, about 40 parts of glycidyl methylacrylate and about 7 parts of α,α'-azoisobutyric acid dinitrile,
(b) About 600 parts of hexamethylenediisocyanate and a mixture of about 500 parts of methyl acrylate, about 45 parts of glycidyl methacrylate and about 7 parts of α,α'-azoisobutyric acid dinitrile,
(c) About 600 parts of m-xylylenediisocyanate and a mixture of about 500 parts of ethyl acrylate, about 45 parts of glycidyl methacrylate and about 7 parts of α,α'-azoisobutyric acid dinitrile,
(d) About 600 parts of hexamethylenediisocyanate and a mixture of about 500 parts of ethyl acrylate, about 40 parts of glycidyl methacrylate and about 7 parts of α,α'-azoisobutyric acid dinitrile.

The telomerization is carried out in the course of about 8 hours in the manner described in Example 1, and the telomerization products are freed from the monomers by thin layer distillation at about 120° C. and about 0.2 mm. Hg. The following telomerization products containing epoxy and isocyanate groups are obtained:

(a) Yield: About 550 parts; 93% vinyl acetate conversion; NCO content: 4.2%; epoxide equivalent of the telomer after the NCO groups have been urethanized with n-butanol: about 1700;
(b) Yield: About 530 parts; 89% methyl acrylate conversion; NCO content: 3.9%; epoxide equivalent about 1650;
(c) Yield: About 735 parts; 87% ethyl acrylate conversion; NCO content: 15.2%; epoxide equivalent about 2400;
(d) Yield: About 600 parts; 90% methyl acrylate conversion; NCO content: 6.3%; epoxide equivalent about 1900.

EXAMPLE 9

About 600 parts of hexamethylene diisocyanate and about 37 parts of tertiary butanol are mixed and heated to about 125° C. The tertiary butanol is added on to the hexamethylene diisocyanate in the process, and tertiary butyl N-carbamate which is capable of decomposition to liberate the active reagent is formed. About 500 parts of methyl acrylate in which about 6 parts of α,α'-azobutyric acid dinitrile are dissolved are now introduced dropwise into the polyisocyanate at about 130° C. under nitrogen by the procedure described in Example 1. After a reaction time of about 6 hours, the temperature is raised to about 160° C. About 11,000 parts by volume of isobutylene and about 11,000 parts by volume of $CO_2$ are liberated in the course of about 8 hours during the formation of N,N',N'' - tris - (isocyanatohexyl) - biuret. Yield of telomer solution: About 1010 parts; NCO content: 25.3%; 92% methyl acrylate conversion.

EXAMPLE 10

The same procedure is adopted as in Example 9 but the tertiary butanol is replaced by about 46 parts of glycerol, which, together with the solution of about 6 parts of $\alpha,\alpha'$-azoisobutyric acid dinitrile in about 500 parts of methyl acrylate, is poured dropwise into the polyisocyanate. Telomerization is complete after reaction for about 8 hours at about 130° C. Yield of telomer solution: About 1096 parts; NCO content: 24.9%; 90% methyl acrylate conversion.

EXAMPLE 11

The procedure used in the same as that described in Example 1 and the following reactants are used for the telomerization, telomerization only being initiated on application of heat:

(a) About 250 parts of 4,4' - diisocyanato - diphenylmethane and about 312 parts of styrene,
(b) About 600 parts of an isomeric mixture of about 80 parts of 1-methylbenzene - 2,4 - diisocyanate and about 20 parts of 1-methylbenzene - 2,6 - diisocyanate and about 830 parts of styrene.

In contrast to Example 1, telomerization is carried out at a temperature of about 140° C. In the case of (a), 87% conversion of styrene is obtained. Yield: About 521 parts. The resulting telomer together with excess diphenylmethanediisocyanate has an NCO content of 16.5% and is completely soluble in cyclohexane. In the case of (b), 38.5% by weight conversion of styrene is achieved during the telomerization. The telomer obtained, in the form of a mixture with excess toluylene diisocyanate, has an NCO content of 29.5%.

EXAMPLE 12

The procedure is the same as that described in Example 1, and about 100 parts of vinyl acetate in which 1.3 parts of $\alpha,\alpha'$-azoisobutyric acid dinitrile are dissolved are slowly added dropwise to about 86 parts of methoxy methylisocyanate in the course of about 8 hours at about 80° C. After the addition of monomer is completed, the reaction mixture is kept at about 90° C. for a further 8 hours and is then left to cool. At this point, the telomer solution has an NCO content of 22.3%. Vinyl acetate conversion is about 89%. Excess methoxymethylisocyanate is distilled off and the telomer is freed from traces of monomer by thin layer evaporation under a high vacuum of about 0.2 mm. Hg at about 140° C. Yield of telomer: About 97 parts; NCO content of the telomer: 1.7%; average molecular weight: About 2400.

When methoxymethyl isocyanate is replaced by methylisocyanate, ethyl isocyanate, butyl isocyanate or stearyl isocyanate, telomers with similar average molecular weights are obtained. However, the use of benzyl isocyanate as telogen leads to the formation of telomers which have average molecular weights of about 600 to 800.

EXAMPLE 13

About 1000 parts of high molecular weight polyisocyanates which have been prepared, respectively, from the following compounds:

(a) 1 mol of polypropylene glycol polyether of OH number 56 and 2 mols of 4,4'-diisocyanato-diphenylmethane (NCO 2.1%),
(b) 1 mol of a polyester of adipic acid, ethylene glycol, 2,2-dimethyl - propanediol-(1,3)- and 1,4 - butanediol molar ratio of the glycols: 0.5:0.25:0.25) of OH number 57 and 2 mols of hexamethylene diisocyanate NCO 2.1%),
(c) 1 mol of polypropylene glycol polyether of OH number 56 and 2 mols of hexamethylene diisocyanate (NCO 2.2%) are made, in each case, to undergo telomerization as in Example 1 with about 200 parts of styrene in which about 2.8 parts of $\alpha,\alpha'$-azoisobutyric acid nitrile are dissolved. Telomer solutions or emulsions which can easily be poured and which have the following NCO contents are obtained:

(a) Yield: About 1190 parts, NCO content 1.55%
(b) Yield: About 1192 parts, NCO content 1.68%
(c) Yield: About 1185 parts, NCO content 1.72%

EXAMPLE 14

(Example of use of telomers)

About 500 parts of the telomerization product prepared under (a) in Example 13, which has an NCO content of 1.55% are heated to about 125° C., and a mixture of about 0.5 part of zinc octoate and about 6.3 parts of 1,4-butylene glycol is stirred into this product. The mixture is then poured on a support and heated to about 100° C. for about 48 hours. A rubbery, elastic polyurethane which has the following properties is obtained:

Ultimate tensile strength: 115 kg./cm.$^2$
Elongation at break: 250%
Elasticity: 39%
Ring structure: 9
Shore hardness: 59°

EXAMPLE 15

(Example of use for stabilizing polyoxymethylene)

Separate portions, of about 100 parts each, of a pulverulent, unstabilized high molecular weight polyoxymethylene of average molecular weight 30,000 are suspended in acetone and mixed with about 0.9 part of the following telomerization products of Example 7, the NCO groups of which have been converted into semicarbazide groups by reaction with excess N,N'-dimethylhydrazine. Acetone is evaporated off with vigorous stirring and the pulverulent polyoxymethylene is dried under vacuum at about 70° C. The thermostability of the samples is determined at about 220° C. under nitrogen.

```
                                    Weight loss of the samples
                                    after 120 min. at 220° C.
Samples:                            in percent by wt.
  Unstabilized polyoxy methylene diacetate ____ 4.9
  Sample (a), Example 7 _____ 0.95
  Sample (c), Example 7 _____ 0.54
  Sample (f), Example 7 _____ 0.75
```

Although the invention has been described in considerable detail in the foregoing, it is to be understood that such detail is solely for the purpose of illustration and that many variations can be made by those skilled in the art without departing from the spirit and scope of the invention except as set forth in the claims.

EXAMPLE 16

500 parts by weight of 4,4'-diisocyanatodiphenylmethane, which has a carbodiimide content of about 2.2%, are reacted as described in Example 1 with a solution of 2 parts by weight of $\alpha,\alpha'$-azobutyric acid dinitrile in 200 parts by weight of acrylic acid butyl ester and 6 parts by weight of acrylic acid, and subsequently freed from monomeric acrylic acid butyl ester by thin layer distillation at 120° C. and 0.2 mm. Hg. Vinyl monomer conversion: 72% by weight; yield of modified polyisocyanate: 640 parts by weight; NCO content. 23.2%.

EXAMPLE 17

500 parts by weight of 4,4'-diisocyanatodiphenylmethane each, which has a content of 25% by weight of an addition product of (a) 2 mols of 4,4'-diisocyanatodiphenylmethane and 1 mol of dipropylene glycol and
(b) 2 mols of 4,4'-diisocyanatodiphenylmethane and 1 mol of diethylene glycol and
(c) 2 mols of 4,4'-diisocyanatodiphenylmethane and 1 mol of triethylene glycol are reacted as described in Example 1, with 200 parts by weight of acrylic acid butyl ester-acrylic acid ethyl ester (1:1) and 2 parts by weight of α,α'-azoisobutyric acid dinitrile. Working up is carried out as described in Example 16.

(a') vinyl monomer conversion: 75% b yweight; yield: 645 parts by weight; NCO content of the modified polyisocyanate: 18.4%
(b') vinyl monomer conversion: 72% by weight; yield: 639 parts by weight; NCO content of the modified polyisocyanate: 19.2%
(c') vinyl monomer conversion: 74% by weight; yield of the modified polyisocyanate: 643 parts by weight; NCO content: 17.5%.

EXAMPLE 18

500 parts by weight of an isomeric mixture of 1-methylbenzene-2,4 - diisocyanate and 1-methylbenzene-2,6-diisocyanate (80:20% by weight), which has a content of 20% by weight of an addition product of 2 mols of the aforesaid isomeric mixture and 1 mol of diethylene glycol are reacted as described in Example 16 with a solution of 2 parts by weight of α,α'-azoisobutyric acid dinitrile in 200 parts by weight of acrylic acid butyl ester and 4 parts by weight of acrylic acid, and then freed from vinyl monomers as described in Example 16. Vinyl monomer conversion: about 80% by weight; yield of modified polyisocyanate: 660 parts by weight; NCO content: 30.9%.

EXAMPLE 19

A mixture of polyisocyanates consisting of 500 parts by weight of 4,4'-diisocyanatodiphenylmethane and 500 parts by weight of an isomeric mixture of 1-methylbenzene-2,4 - diisocyanate and 1 - methylbenzene - 2,6-diisocyanate (80:20% by weight), which has a content of 20% by weight of an addition product of 2 mols of the foresaid isomeric mixture and 1 mol of diethylene glycol, is reacted as described in Example 16 with a solution of 7 parts by weight of α,α'-azoisobutyric acid dinitrile in 400 parts by weight of acrylic acid butyl ester and 10 parts by weight of acrylic acid, and subsequently worked up as described in Example 16.

Vinyl monomer conversion: 80% by weight; yield of modified polyisocyanate mixture: 1318 parts by weight; NCO content 27.2%.

By polymerising 100 parts by weight of this modified polyisocyanate mixture with 3 parts by weight of permethylated diethylene triamine and 5 parts by weight of tris-(dimethylaminomethyl)-phenol there is obtained a rigid foam which, as compared with a foam prepared in analogous manner from a corresponding non-modified polyisocyanate mixture, shows a substantially lower brittleness and increased abrasion resistance.

EXAMPLE 20

A solution of 2.5 parts by weight of α,α'-azoisobutyric acid dinitrile in a mixture of 180 parts by weight of acrylic acid butyl ester, 10 parts by weight of acrylic acid ethyl ester and 10 parts by weight of styrene is reacted as described in Example 16 with the following high molecular weight NCO group-containing polyethers, polyesters and polycarbonates:

(a) 500 parts by weight of a propylene glycol polyether containing on the average 3 NCO groups per molecule, which is prepared from 1 mol of polyether and 3 mols of 1-methylbenzene-2,4-diisocyanate. NCO content of the prepolymer: 3.28%.
(b) 500 parts by weight of a propylene glycol polyether containing on the average 3 NCO groups per molecule, which is prepared from a 1mol of polyether and 3 mols of hexamethylenediisocyanate-(1,6). NCO content of the prepolymer: 3.4%.
(c) 500 parts by weight of a propylene glycol ethylene glycolpolyether containing on the average 3 NCO groups per molecule, which is prepared from 1 mol of polyether and 3 mols of m-xylylene diisocyanate. NCO content of the prepolymer: 2.9%.
(d) 500 parts by weight of a propylene glycol ethylene glycolpolyether containing on the average 3 NCO groups per molecule, which is prepared from 1 mol of polyether and 3 mols of isophorone diisocyanate. NCO content of the prepolymer: 2.5%.
(e) 500 parts by weight of a terminal NCO group-containing polyester of adipic acid and diethylene glycol, which has an average molecular weight of about 1000 and which is prepared from 1 mol of a polyester and 2 mols of 1-methylbenzene-2,4-diisocyanate. NCO content of the prepolymer: 6.1%.
(f) 500 parts by weight of a terminal NCO-group-containing polycarbonate of hexanediol and diphenylcarbonate, which has an average molecular weight of about 1000 and which is prepared from 1 mol of polycarbonate and 2 mols of 4,4'-diisocyanatodiphenylmethane. NCO content of the prepolymer: 5.6%.
(g) 500 parts by weight of a terminal NCO-group-containing polythioether of thiodiglycol and hexanediol (70:20% by weight), which has an average molecular weight of about 1000 and which is prepared from 1 mol of 1-methylbenzene-2,4-diisocyanate and 1 mol of polythioether. NCO content of the prepolymer: 5.9%.
(h) 500 parts by weight of a terminal NCO-group-containing polyether of tetrahydrofurane and propyleneoxide (80:20% by weight), which has an average molecular weight of about 1000, and which is prepared from 2 mols of 1-methylbenzene-2,4-diisocyanate and 1 mol of polyether. NCO content of the prepolymer: 6.0%.

After working up as described in Example 16 there are obtained in all cases (a)–(h) storage-stable, readily soluble NCO-group-containing prepolymers which are modified by telomerisation, in the following yields and with the following NCO contents:

(a') vinyl monomer conversion: about 80% by weight; yield: 660 parts by weight; NCO content: 1.74%.
(b') vinyl monomer conversion: about 85% by weight; yield: 672 parts by weight; NCO content: 1.92%.
(c') vinyl monomer conversion: about 90% by weight; yield: 680 parts by weight; NCO content: 1.5%.
(d') vinyl monomer conversion: about 86% by weight; yield: about 670 parts by weight; NCO content: 1.5%.
(e') vinyl monomer conversion: about 79% by weight; yield: about 660 parts by weight; NCO content 1.3%.
(f') vinyl monomer conversion: about 81% by weight; yield: about 661 parts by weight; NCO content about 3.8%.
(g') vinyl monomer conversion: about 80% by weight; yield: about 660 parts by weight; NCO content 2.9%.
(h') vinyl monomer conversion: about 90% by weight; yield: about 679 parts by weight; NCO content: 4.2%.

By reacting the modified polyisocyanates or solutions of the modified polyisocyanates (a')–(h') e.g. in ethyl acetate-xylene (1:1) with 0.2% by weight of zinc octoate, and painting on glass, wood, paper or fabrics, there are obtained cross-linked elastic lacquer coatings after 4 hours.

By reacting the modified polyisocyanates (a')–(h') per 1 mol of polyisocyanate with 2.5 mols of 1,4-butylene glycol at 100° C. there are obtained at 60–80° C. pourable, modified hydroxyl-group-containing polyethers, polythioethers, polyesters or polycarbonates.

By reacting the modified polyisocyanates (a')–(h') per 1 mol of polyisocyanate with 1 mol of 1,4-butylene-glycol at 120° C. there are obtained storable thermoplastic products which can be processed on the roller and which are converted into the cross-linked elastic state upon addition of 8% by weight of dimeric toluylene diisocyanate.

When adding the modified polyisocyanates (a')–(h') in quantities up to 30% by weight to technical 4,4'-diisocyanatodiphenylmethane or toluylene diisocyanate and foaming the mixture in known manner with polyhydroxyl compounds there are obtained foams which are distinguished by improved hydrophobic properties, improved tensile strength and elongation at break.

What is claimed is:

1. A process for the production of isocyanate group-containing telomers, which comprises reacting an organic monoisocyanate or an organic polyisocyanate with ethylenically unsaturated monomers from 1 to 15 mol percent of said unsaturated monomers containing a grouping selected from the class consisting of —OH, —NH$_2$, —COOH, epoxy, N-methylolmethyl ether or mixtures thereof, said reaction occurring with heating, in the presence of high-energy radiation, in the presence of peroxidic or nitrogen-containing radical forming agents or combinations thereof.

2. The process of claim 1 wherein the organic isocyanate is an aliphatic, cycloaliphatic or araliphatic isocyanate, which contains at least one hydrogen atom on a carbon atom in the α-position to the NCO group, 2,4-toluylene diisocyanate, 2,6-toluylene diisocyanate, 4,4'-diphenylmethane diisocyanate, 1,5-naphthylenediisocyanate or mixtures thereof.

3. The process of claim 1 wherein from 99 to 85 mol percent of the total ethylenically unsaturated monomers is selected from the group consisting of an acrylic acid ester, vinyl chloride, styrene, chlorobutadiene, 2,3-dichlorobutadiene and mixtures thereof.

4. The process of claim 1 wherein an excess of organic isocyanate is used.

5. The process of claim 1 wherein the reaction is conducted at a temperature of from about 15 to about 250° C.

6. Isocyanate-containing telomers prepared by the process of claim 1.

References Cited

UNITED STATES PATENTS

| | | | |
|---|---|---|---|
| 3,058,899 | 10/1962 | Yanko et al. | 204—158 |
| 3,245,941 | 4/1966 | Mayer et al. | 260—31.6 |
| 3,297,745 | 1/1967 | Fekete et al. | 260—471 |
| 3,383,351 | 5/1968 | Stamberger | 260—33.2 |
| 3,405,162 | 10/1968 | Kuryla | 260—465.6 |
| 3,422,165 | 1/1969 | Brotherton et al. | 260—859 |
| 3,427,346 | 2/1969 | Brotherton et al. | 260—485 |
| 3,448,171 | 6/1969 | Damusis | 260—859 |
| 3,451,952 | 6/1969 | Slocombe | 260—2.5 |
| 3,480,591 | 11/1969 | Oertel et al. | 260—75 |
| 3,517,039 | 6/1970 | Wagner et al. | 260—404.5 |

MAURICE J. WELSH, Primary Examiner

H. S. COCKERAM, Assistant Examiner

U.S. Cl. X.R.

204—159.22; 260—2.5 AT, 45.9, 77.5 AA, 77.5 AT, 77.5 CR, 859